United States Patent Office 3,350,671
Patented Oct. 31, 1967

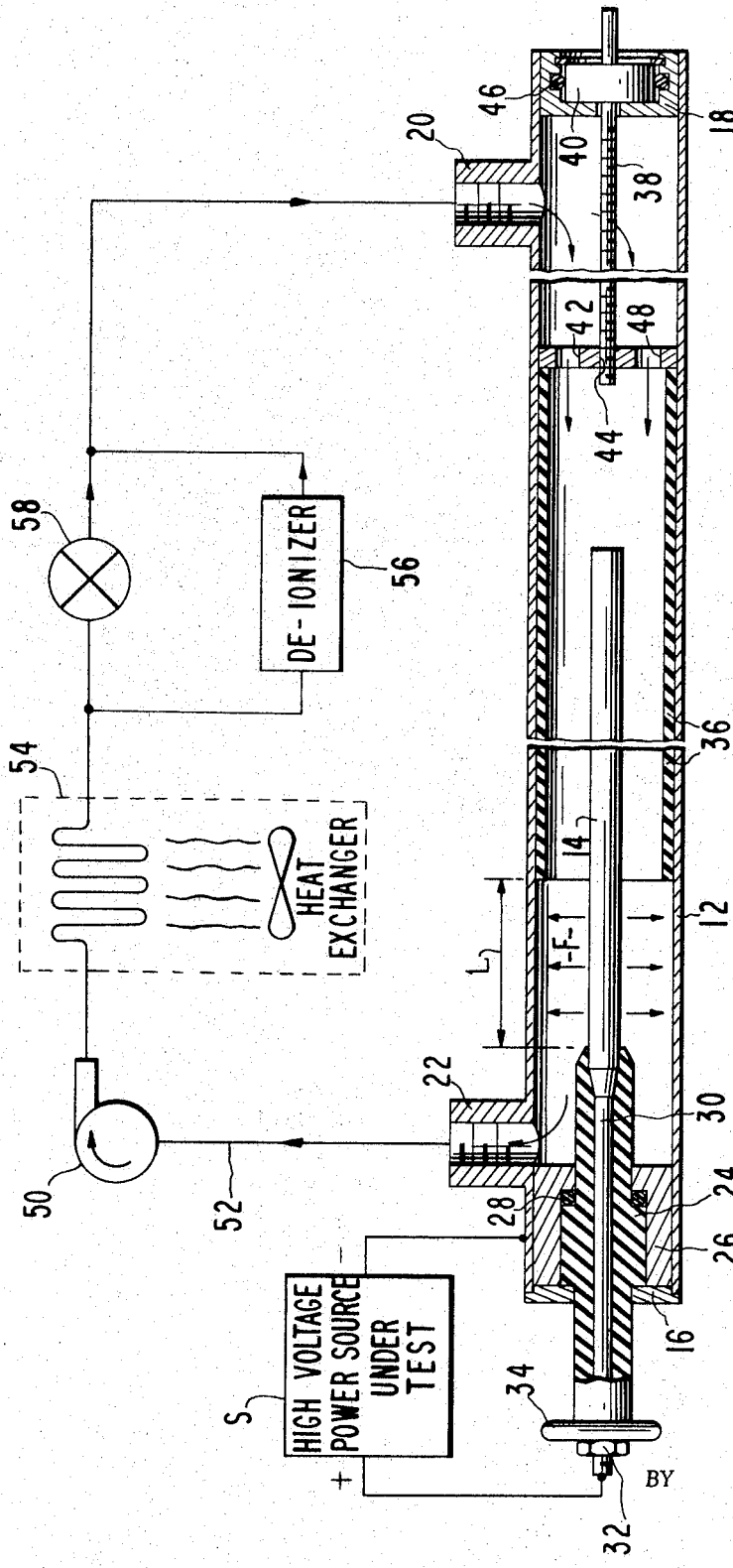

3,350,671
HIGH POWER-HIGH VOLTAGE WATERLOAD
Robert C. Seamans, Jr., Deputy Administrator of the National Aeronautics and Space Administration, with respect to an invention of Duane P. Littlejohn, Santa Clara, and Arthur E. Reed, Sunnyvale, Calif.
Filed July 27, 1966, Ser. No. 568,352
6 Claims. (Cl. 338—82)

This invention relates to a variable high power water load for dissipating large amounts of electrical power during testing of high power output electrical apparatus. The invention is particularly suitable for testing high voltage, high power DC power supplies of the type used in powering communications transmitters.

In order accurately to test high power output power supplies it is necessary to operate such power supplies at the rated output thereof. Provision of a dummy load for the power supply is desirable in order to avoid transmission of unnecessary radiation as would occur if the power supply were connected to a transmitter. The present invention provides a dummy load suitable for such purpose.

The principal object of the invention is to provide such dummy load in which the current capacity, and hence the power dissipating capacity, of the load can be readily and conveniently varied during operation of the apparatus. Variability of the load permits operation of the power supply in a stable condition at the rated current, voltage, and power levels at which the power supply operates when it is connected into the operative circuit with which it is used.

The specific embodiment of the invention that is explained in more detail hereinafter includes an electrically conductive hollow tube that is provided with fluid openings at opposite ends thereof, an electrically conductive rod mounted in the tube approximately coaxially thereof, and an insulative sleeve mounted in the tube between the inner tube wall and the rod with provisions for sliding the sleeve within the tube to vary the radial current path through fluid from the rod to the tube interior. Fluid conducted through the tube is heated by passage of current therethrough and is cooled at an externally located heat exchanger for recirculation through the tube.

Known prior art techniques for controlling the power dissipation capabilities of such apparatus typically employ devices for varying the flow rate of fluid through the dummy load, and while such systems afford variability of the total power dissipation, they do not afford variability of the current capacity of the load. The adjustable insulative sleeve of the present invention permits variation in current flow, and hence, power dissipation, whereby power supplies can be tested under conditions that accurately correspond to actual operating conditions.

A feature and advantage of the present invention is that current flow through the load can be adjusted while power is applied to the load. As power is supplied to water loads, the temperature of the water and the apparatus containing the water increases. The increased temperature causes a change in the resistance of the water, as a consequence of which the amount of current flow changes. Because the load of the present invention is adjustable during operation, the system can be readily stabilized at the rated current and power output of the power supply under test.

Another feature and advantage of the present invention is that fluid flow controlling and cooling accouterments employed with the apparatus can be significantly simplified since the invention affords an internally disposed current flow adjustment structure.

A further feature and advantage is that the dummy load of the present invention is particularly suitable for high voltage operation since it employs coaxially oriented conductive members. Such structure is substantially free of sharp edges and/or corners that would, if present, contribute to arcing under high voltage operation.

Other objects, features and advantages will be apparent after referring to the following specification and accompanying drawing in which:

The sole figure is a side view in partial cross section of a dummy water load according to the present invention, portions of the drawing being shown in schematic form.

Referring more particularly to the drawing, reference numeral 12 indicates an electrically conductive fluid impervious hollow tube, centrally and coaxially of which is mounted a conductive rod 14. Tube 12 and rod 14 form electrodes to which the terminals of a high voltage power source S under test are connected; the tube and rod were constructed of #304 stainless steel tubing in one apparatus constructed according to the invention.

Tube 12 is provided with fluid tight end caps 16 and 18, thereby defining a fluid tight chamber; the tube is further provided with a fluid inlet fitting 20 and a fluid outlet 22 for communicating fluid through the chamber. Intermediate fluid outlet opening 22 and end cap 16 a molded high voltage insulator 24 is supported centrally of the tube on a mounting collar 26 for mounting rod 14 centrally of tube 12. An O-ring 28 is provided between insulator 24 and collar 26 to form a fluid tight seal therebetween. A conductor 30 extends through insulator 24 and is connected at the inner end thereof to rod 14 and at the outer end to a connecting terminal 32 to which one output terminal of power source S is connected. A corona ring 34 is provided inwardly of terminal 32 to avoid arcing between the terminal and end plate 16 and/or tube 12.

Mounted within tube 12 for slidable axial movement therein is a hollow insulative sleeve 36. The outer diameter of insulative sleeve 36 is approximately equal to the inner diameter of tube 12 so that little or no fluid flows or resides between the inner surface of the tube and the outer surface of the sleeve. Because tube 36 is formed of insulative material, polyvinyl chloride for example, it interrupts a portion of the radially oriented current path between rod 14 and tube 12. The portion of the current path interrupted by sleeve 36 is adjustable, and for this purpose a threaded shaft 38 is supported in a thrust bushing 40 carried in end cap 18. An apertured disc 42 is joined to the axial end of sleeve 36 and is formed centrally thereof with a threaded hole 44 for threaded engagement with shaft 38. An O-ring 46 is provided for affording a fluid tight joint between bushing 40 and end cap 18. It will thus be seen that rotation of shaft 38 moves sleeve 36 axially of tube 12.

Disc 42 is exemplary of any suitable element for operatively connecting shaft 38 to sleeve 36 without restricting fluid flow between inlet opening 20 and outlet opening 22. Disc 42 is provided with one or more apertures 48 to permit such fluid flow. It can therefore be seen that fluid entering inlet fitting 20 will flow axially of the annular space between sleeve 36 and rod 14, thence through the annular space between tube 12 and rod 14, and thence out through outlet opening 22.

A pump 50 is connected to the apparatus through a suitable conduit 52 for circulating fluid, such as water, through the system. Such fluid is conveyed through a conventional heat exchanger depicted schematically at 54 to cool the fluid and is further conveyed through a de-ionizer 56 of conventional form. A metering valve 58 is provided in parallel with de-ionizer 56 so as to assure that any electrochemical change in the fluid caused by flow through the tube 12 will be obviated before recirculation of the fluid.

The operation of the apparatus can be understood by assuming that high voltage power source S has one output terminal thereof connected to tube 12 and the other output terminal thereof connected to rod 14 through terminal 32 and conductor 30. Assuming a conventional current flow, as contrasted with electron flow, the current will pass from rod 14 through the fluid F flowing through the annular chamber between the rod and tube 12 and thence through the tube wall back to the power source. Because the fluid F affords a resistance to current flow, power is dissipated and power source S is loaded. Power dissipation in the fluid creates heat which causes the temperature of the fluid to increase and the resistance of the fluid to decrease. Should such decrease in resistivity cause an increase in current above the current desired, shaft 38 is rotated to move sleeve 36 inwardly, toward the left as viewed in the drawing, to decrease the cross-sectional area of the radial current path from rod 14 to tube 12 through the fluid. Reduction of the cross-sectional area of the current path increases the resistance thereof and therefore, decreases the current flow. Until the temperature of the system is stabilized, adjustments of sleeve 36 by rotation of shaft 38 will maintain current flow at the desired amount. As a complement to adjustment of sleeve 36, the rate of flow afforded by pump 50 and the rate of cooling afforded by heat exchanger 54 can be adjusted in accordance with well-known criteria.

A more complete understanding of the operation of the present invention can be had by a quantitative consideration of a specific apparatus designed in accordance with the invention. Such apparatus is capable of dissipating one megawatt of power. In the apparatus, pump 50 operates to maintain a flow, Q, of 200 gallons per minute (g.p.m.) and heat exchanger 54 operates to permit a temperature rise ($\Delta T$) between inlet opening 20 and outlet opening 22 of 19° C. That such parameters afford 1 megawatt dissipation can be deprived from the equation:

$$P = .264 \times Q \times \Delta T \qquad (1)$$

in which:

P is power dissipated in kilowatts;
.264 is a constant determined by system geometry and the characteristics of fluid F;
Q is rate of fluid flow in gallons per minute; and
$\Delta T$ is temperature rise in degrees centigrade between inlet opening 20 and outlet opening 22.

Adjustment for a given resistance value may be calculated from the following equations.
The resistance:

$$R_L = \frac{\rho}{2\pi L} \qquad (2)$$

where:

$\rho$ = resistivity (ohm-cm.)
$L$ = exposed length of electrode (cm.)

As seen from the above equation, the resistance ($R_L$) varies directly as resistivity ($\rho$).

During a normal operation ($\rho$) can be expected to vary over a comparatively wide range due to a number of causes. The first order cause can be expected to be a result of temperature change in the relation:

$$\rho = \frac{K}{T} \qquad (3)$$

in which K is a constant and T is the temperature of fluid F in degrees centigrade.

In view of these facts, an example of adjustment for a particular ($R_L$) will assume a fixed ($\rho$) of 1 megohm-cm. at a fixed temperature and $$R_L = 5000 \Omega \qquad (4)$$

From Equation 1:

$$L = \frac{\rho}{2\pi R_L} \text{ cm.} \qquad (5)$$

or:

$$L = \frac{\rho}{2\pi(2.54)R_L} \text{ in.} \qquad (6)$$

A combination of Equations 4 and 6 yields:

$$L = \frac{1 \times 10^6}{2\pi(2.54)(5 \times 10^3)} = 12.55 \text{ in.}$$

The length of rod 14 exposed by adjustment of sleeve 36 in the exemplary apparatus has the following adjustment range:

Maximum exposed electrode for minimum resistance—31.1 in.;
Minimum exposed electrode for maximum resistance—0.625 in.

When voltage is first applied to the load design as described hereinabove, a given current will flow depending on the length of rod 14 exposed by movement of sleeve 36, resistivity $\rho$, and temperature of the water at inlet opening 20. As the power to the load is increased, the average temperature over the length of the rod 14 will increase causing a further increase in current due to the drop in resistivity. At any particular power level and fixed inlet temperature, the current will stabilize and remain essentially constant. Total adjustment of the sleeve 36 is possible during any level of operation to allow manual adjustment of the length L of rod 14 exposed to tube 14 until stabilization occurs. The adjustment of sleeve 36 permits stable operation at any level of operation and the control of pump 52 and heat exchanger 54 permits establishment of a constant temperature at inlet fitting 20. The exemplary apparatus described above is satisfactory for loading a 50,000 volt DC power supply at one megawatt.

Thus it will be seen that the present invention provides a dummy load capable of stable operation at high power levels in which load the current and the total power dissipated are adjustable. Because of the coaxial configuration of tube 12 and rod 14 the apparatus is suitable for high voltages such as 50 kv. Thus testing of power supplies under actual operating conditions is made possible without causing spurious and unwanted electromagnetic radiations.

While one embodiment of the present invention has been shown and described it will be apparent that other adaptations and modifications can be made without departing from the true spirit and scope of the invention.

What is claimed is:

1. A test load for a direct current power supply of the type having first and second output terminals, said load comprising an elongate hollow conductive tube for connection to said first terminal, an elongate conductive rod mounted in said tube centrally and along the longitudinal axis thereof for connection to said second terminal, said rod having an outer cross-sectional extent less than the inner cross-sectional extent of said tube to define a chamber therebetween, means for conveying a conductive fluid through said chamber to establish a current path between said rod and said tube, an elongate insulative hollow sleeve mounted in said chamber, said sleeve having an outer configuration substantially congruent to the inner configuration of said tube to afford relative sliding movement therebetween in fluid tight relation, and means for adjustably positioning said sleeve to vary the area of the path between said tube and said rod through said fluid.

2. A test load according to claim 1 wherein said tube and said sleeve are of hollow cylindric form and wherein said rod has a cylindric exterior surface concentric with said tube and sleeve to define an annular fluid chamber therebetween.

3. A test load according to claim 1 having means including an insulator at one end of said tube for supporting said rod therein, a bushing at the opposite end of said tube, a threaded shaft carried in said bushing and having an inner end extending into said tube, means for attaching said inner end to said sleeve, and means for threadedly engaging said shaft so that rotation thereof effects positioned adjustment of said sleeve longitudinally of said tube.

4. A test load according to claim 1 in combination with means for delivering fluid to said conveying means including a pump, a heat exchanger in series with said pump, and means for connecting said pump and said heat exchanger to said tube.

5. A test load for a direct current power supply comprising a conductive hollow fluid impervious tube having an inlet opening at one end thereof and an outlet opening at the opposite end thereof, an elongate conductive rod having an outside diameter less than the inside diameter of said tube, means for mounting said rod in said tube coaxially thereof, said mounting means being insulative so that said rod is electrically isolated from said tube, a hollow insulative sleeve mounted in said tube, said sleeve having an outer diameter substantially equal to the inner diameter of said sleeve to support said sleeve in said tube for sliding axial movement, means for adjustably positioning said sleeve within said tube to vary the area of said rod that directly confronts the inner surface of said tube, whereby when a high voltage power source is connected between said tube and said rod and a fluid is circulated through said tube from the inlet opening to the outlet opening, current flow between said rod and said tube can be adjusted by adjusting the longitudinal position of said sleeve.

6. In a power supply test load of the type including a conductive hollow fluid impervious tube, an elongate conductive rod having an outside diameter less than the inside diameter of said tube, means for mounting said rod in said tube coaxially thereof, said mounting means being insulative so that said rod is electrically isolated from said tube, and inlet and outlet fittings for conveying fluid through said tube to provide an electrically conductive medium between the rod and the tube; the improvement comprising a hollow insulative sleeve mounted in said tube, said sleeve having an outer diameter substantially equal to the inner diameter of said sleeve to support said sleeve in said tube for sliding axial movement and means for adjustably positioning said sleeve within said tube to vary the area of said rod that directly confronts the inner surface of said tube.

References Cited

UNITED STATES PATENTS

| 2,983,145 | 5/1961 | Horn et al. | 73—193 |
| 3,167,957 | 2/1965 | Ziviani | 73—193 |

FOREIGN PATENTS

| 101,381 | 7/1937 | Australia. |
| 107,266 | 5/1939 | Australia. |

ROBERT K. SCHAEFER, *Primary Examiner.*

H. J. HOHAUSER, *Assistant Examiner.*